United States Patent [19]

Burke et al.

[11] Patent Number: 5,532,566
[45] Date of Patent: Jul. 2, 1996

[54] VOLTAGE MODE DRIVE OF SERVO SYSTEM

[75] Inventors: Edward F. Burke, Lake Oswego; David L. Knierim, Wilsonville, both of Oreg.

[73] Assignee: Tektronix, Inc., Wilsonville, Oreg.

[21] Appl. No.: 382,348

[22] Filed: Feb. 1, 1995

[51] Int. Cl.$^6$ ...................................................... G05F 1/10
[52] U.S. Cl. ................ 318/650; 318/568.22; 318/568.1; 318/567; 364/130
[58] Field of Search .......................... 318/568.22, 568.1, 318/561, 567, 650, 798–815, 600, 569, 560; 364/130, 148, 151

[56] References Cited

U.S. PATENT DOCUMENTS

| | | | |
|---|---|---|---|
| 4,791,548 | 12/1988 | Yoshikawa et al. | 318/561 X |
| 4,792,737 | 12/1988 | Goff et al. | 318/560 X |
| 5,057,759 | 10/1991 | Ueda et al. | 318/561 X |
| 5,159,254 | 10/1992 | Teshima | 318/560 X |
| 5,268,625 | 12/1993 | Plummer | 318/560 X |
| 5,296,792 | 3/1994 | Knierim | 318/685 |
| 5,369,345 | 11/1994 | Phan et al. | 318/561 X |
| 5,440,213 | 8/1995 | Arita et al. | 318/561 X |
| 5,442,268 | 8/1995 | Goodarzi et al. | 318/798 X |
| 5,442,270 | 8/1995 | Tetsuaki | 318/568.1 X |

OTHER PUBLICATIONS

"Digital Control of Dynamic Systems" Second Edition Gene F. Franklin, J. David Powell and Michael L. Workman Chapter 5.
"Design of Digital Control Systems Using State–Space Methods" Chapter 6.

*Primary Examiner*—William M. Shoop, Jr.
*Assistant Examiner*—Karen Masih
*Attorney, Agent, or Firm*—Francis I. Gray

[57] ABSTRACT

A voltage mode drive for a servo system builds a drive matrix from an error signal, which is the difference between a measured value for a parameter of the servo system, such as the position of a rotating drum, and a reference signal, a voltage control signal for the servo system, and an estimated set of parameters for the servo system, the parameters including drive current. The outputs from the drive matrix are a new estimated set of parameters for the servo system which are multiplied by appropriate system constants to produce the voltage control signal. The voltage control signal is amplified by a voltage amplifier and applied to drive the servo system.

9 Claims, 4 Drawing Sheets

VOLTAGE MODE DRIVE OF SERVO SYSTEM

BACKGROUND OF THE INVENTION

The present invention relates to servo systems, and more particularly to a voltage mode drive of a servo system to reduce drive amplifier circuit complexity.

Classical designs for digital controllers for driving a servo system include frequency- response methods where the gain and phase characteristics of the system in response to frequency are plotted in Bode plots manually. Simplistically for stability the frequency gain response should be less than unity when the phase response is 180 degrees out-of-phase in a negative feedback system. Therefore based upon the Bode plots a compensation circuit is designed to modify the response of the system to achieve stability with the desired gain. More recently a state-space formulation, using computer aided design (CAD) packages for the computation of discrete equivalents, has been implemented. The differential equations that describe the system are used and, using the CAD packages such as the MATLAB™ linear algebra matrix manipulation program from The Mathworks of Natick, Mass., the classical transfer function of a continuous system is transformed to the state-space continuous description. The final control algorithm consists of a combination of the control law and an estimator, with the control law calculations being based on estimated states rather than actual states. The estimator may be an error estimator where the difference between a desired output and the corresponding measured output provides an error signal. Alternatively the estimator may be a "current" (in time) or predictor estimator, as that is referred to in the text books, where estimates are based on present measurements directly. Using the state-space formulation a system matrix is generated for determining the control signal as a function of estimated states, and an estimator matrix is generated for determining the current estimates from prior estimates as a function of the control signal and a feedback signal based upon a measured state. These various designs are described in more detail in Chapters 5 and 6 of "Digital Control of Dynamic Systems" by Franklin, Powell and Workman, 2nd edition, published by Addison-Wesley Publishing Company, incorporated herein by reference.

Conventionally the state-space formulations being implemented generate a current (as in electrical current) control signal to drive the motor. The current control signal is applied through a transconductance amplifier to the windings of the motor. Transconductance power amplifiers, such as that disclosed in U.S. Pat. No. 5,296,792 issued Mar. 22, 1994 to David L. Knierim entitled "Bidirectional Chopper Transconductance Amplifier", incorporated herein by reference, have been traditionally used in electro-mechanical servo systems to drive a servo motor. The servo motor's torque is proportional to its current, not the applied voltage, and a transconductance, or current source, amplifier allows the servo designer to control or program the current directly. There is a tradeoff in this choice, however. Current source amplifiers are usually more complex and expensive than voltage source amplifiers because of the, costly current sense circuitry needed in the transconductance amplifier.

What is desired is a drive mode for a servo system that simplifies the hardware circuitry, especially the drive amplifier circuitry, required for the servo system.

SUMMARY OF THE INVENTION

Accordingly the present invention provides a voltage mode drive for a servo system having a controlled device and a driver device. A voltage control signal is generated by a control matrix that includes estimated values for various servo system parameters, such as position, velocity and current for the driver device and position and velocity for the controlled device. The estimated values are generated by an estimator matrix that has as inputs the prior estimated values, an error signal which is the difference between a measured and a reference value for one of the servo system parameters, or in lieu of the error signal the measured value itself together with the reference value, and the voltage control signal. The estimator may be implemented in a digital signal processing circuit using matrix multiplication or may be emulated by a corresponding IIR filter implementation in either an ASIC or a software design.

The objects, advantages and other novel features of the present invention are apparent from the following detailed description when read in conjunction with the appended claims and attached drawing.

DESCRIPTION OF THE PREFERRED EMBODIMENT

Figure 1:
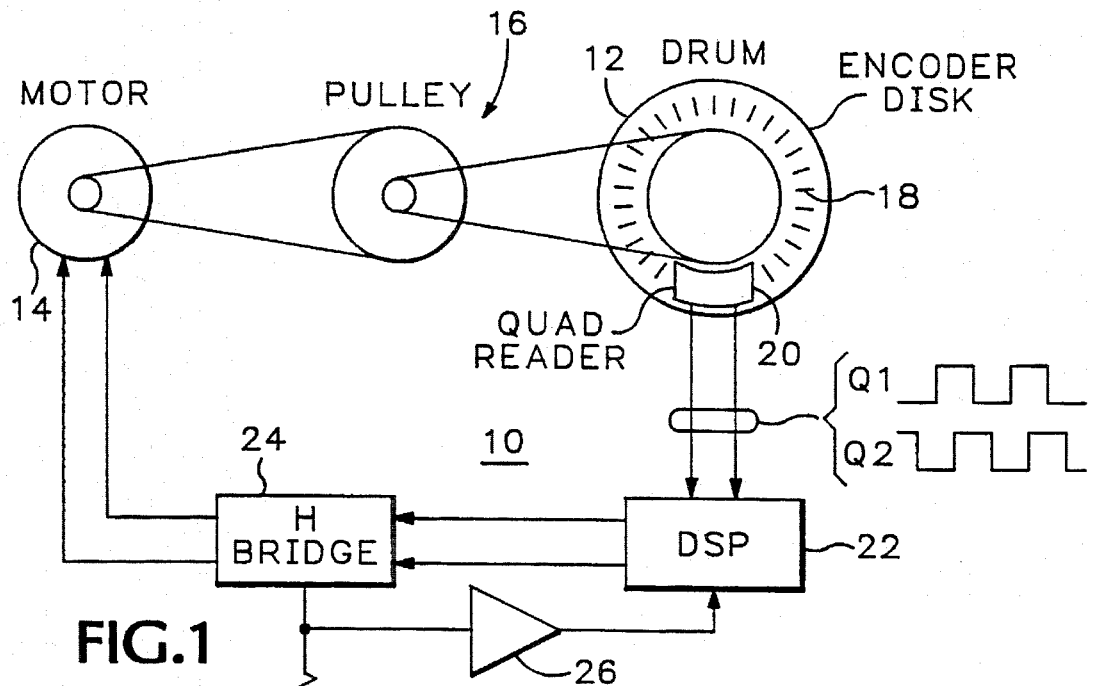
FIG. 1 is a block diagram view of a servo system including voltage mode drive according to the present invention.

Referring now to FIG. 1 a servo system 10 for controlling the position and speed of a rotating drum 12 is shown. A servo motor 14 is coupled to the drum 12 by a suitable drive mechanism, such as a belt and pulley assembly 16. On the drum 12 is located a position encoder 18 in the form of circumferential tick marks. A quadrature reader device 20 detects the tick marks as the drum 12 rotates to output a pair of digital quadrature signals Q1, Q2. The digital quadrature signals are input to a digital signal processor (DSP) 22 which counts the edges of the respective signals from a designated "home" point to determine position. The quadrature signals also are used to determine direction of motion and further may be used to determine velocity, as is well known in the art. The DSP 22 is part of a control system that provides a voltage drive control signal based upon estimation of servo system parameters and the determined position or velocity of the controlled device, for example, as is described in more detail below. The voltage drive control signal is input to a conventional H-bridge driver 24 which provides a voltage across a winding of the servo motor 14, as is well known in the art. A simple current sensor 26 is coupled between the H-bridge driver 24 and the DSP 22 to provide coarse current feedback to the DSP when the current drawn by the servo motor 14 exceeds a threshold value that represents a shutdown condition.

Figure 2:
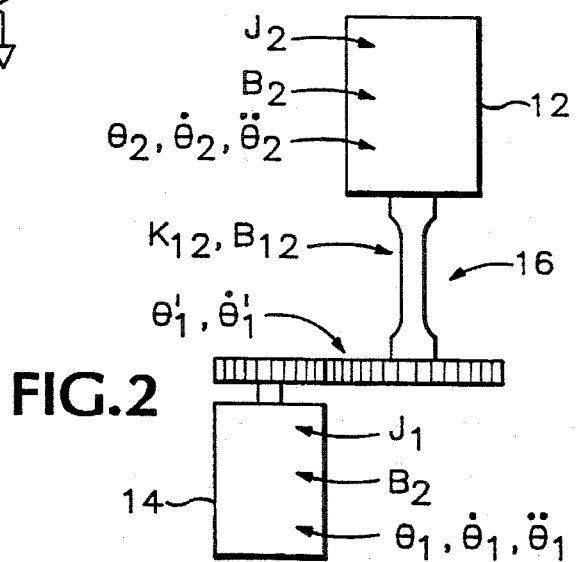
FIG. 2 is a block diagram view of a model for the servo system of FIG. 1.

To derive the control circuit for the servo system of the motor 14, drum 12 and drive connection 16 the system is modeled as shown in FIG. 2. The motor 14 has a certain polar moment of inertia J1, damping coefficient B1 and position, velocity and acceleration values $\Theta1$, $\dot{\Theta}1$, $\ddot{\Theta}1$. Likewise the drum 12 has a certain polar moment of inertia J2, damping coefficient B2 and position, velocity and acceleration $\Theta2$, $\dot{\Theta}2$, $\ddot{\Theta}2$. Finally the drive connection 16 has a damping coefficient B12 and an equivalent torsional stiffness constant K12. For the drive connection 16 shown, the two belts and the idler are condensed into the single damping coefficient B12 and single torsional stiffness constant K12, the pulley being assumed to have negligible mass. The system constants J, B, K may be determined by testing or by calculation, as is well known in the art. Since there is a gain ratio (equivalent to a "gear ratio") between the motor and the drum, the motor position and velocity $\Theta'1$, $\dot{\Theta}'1$ at the input to the drive connection are modified by such gain ratio. From this model of the system the differential equations of motion are written based upon Newton's Law as follows:

$$J1*\ddot{\Theta}1 = -1B1*\dot{\Theta}1 - (K12/N)*(\Theta'1-\Theta2) - (B12/N)*(\dot{\Theta}'1-\dot{\Theta}2) + Ta,$$

where Ta is the torque applied, and $$J2*\ddot{\Theta}2 = -B2*\dot{\Theta}2 + K12*(\Theta'1-\Theta2) + B12*(\dot{\Theta}'1-\dot{\Theta}2).$$

So far this is conventional. However now a differential equation for the motor also is generated as $$V = Lt*\dot{I} + Rt*I + Ke*\dot{\Theta}1$$

or $$Lt*\dot{I} = -Rt*I - Ke*\dot{\Theta}1 + V$$

where V is the voltage applied to the motor, Lt is the inductance of the motor, I is the current through the motor, Rt is the resistance of the motor and Ke is the torsional constant relating back electromotive force (EMF) for the motor. Setting Ta=Kt*I and noting that $\Theta'1=\Theta1/N$, where N is the gain ratio, the differential equations become:

$$\ddot{\Theta}1 = -(B1/J1)*\dot{\Theta}1 - (K12/N*J1)*(\Theta1/N-\Theta2) - (B12/N*J1)*(\dot{\Theta}1/N-\dot{\Theta}2) + (Kt/J1)*I$$

$$\ddot{\Theta}2 = -(B2/J2)*\dot{\Theta}2 + (K12/J2)*(\Theta1/N-\Theta2) + (B12/J2)*(\dot{\Theta}1/N-\dot{\Theta}2)$$

$$\dot{I} = -Ke*\dot{\Theta}1/Lt - Rt*I/Lt + V/Lt$$

This set of equations may be represented as a state variable matrix system according to the following general form equations:

$$[\dot{X}] = [A][X] + [B]U$$

$$[Y] = [C][X] + [D]U$$

where $[X] = [\Theta1, \dot{\Theta}1, \Theta2, \dot{\Theta}2, I]$, $[D]=0$, $[C]=[0, 0, 1, 0, 0,]$ and $[B]=[0, 0, 0, 0, V/Lt]$, U being the driving function. The resulting matrix form is:

$$\begin{bmatrix} \dot{X1} \\ \dot{X2} \\ \dot{X3} \\ \dot{X4} \\ \dot{X5} \end{bmatrix} = \begin{bmatrix} 0 & 1 & 0 & 0 & 0 \\ -K12/(N^{**}2*J1) & -B1/J1-B12/(N^{**}2*J1) & K12/(N*J1) & B12/(N*J1) & Kt/J1 \\ 0 & 0 & 0 & 1 & 0 \\ K12/(J2*N) & B12/(J2*N) & -K12/J2 & -B2/J2-B12/J2 & 0 \\ 0 & -Ke/Lt & 0 & 0 & -Rt/Lt \end{bmatrix} * \begin{bmatrix} X1 \\ X2 \\ X3 \\ X4 \\ X5 \end{bmatrix} + \begin{bmatrix} |0| \\ |0| \\ |0| \\ |0| \\ V/Lt \end{bmatrix}$$

where X1=motor position, X2=motor velocity, X3=drum position, X4=drum velocity and X5=motor current. What is implemented is:

$$[X(k+1)] = [\Phi]*[X(k)] + [\Gamma]*u(k) + [Lv]*\{e(k) - [H]*[X(k)]\}$$

where $$u = -[K]*[X(k)] \text{ and } e(k) = y(k) - r(k) \text{ with } H=[0\ 0\ 1\ 0\ 0].$$

The dynamics may be reviewed using conventional Bode, Root Locus and/or Time Response plots. A sampling rate Ts is chosen according to various system constraints, as is well known in the art. Using a CAD package such as the MATLAB™ linear algebra matrix, manipulation program, the [A], [B] and Ts are transformed into a discrete, sampled form, as is well known in the art, and reviewed again using conventional Bode, Root Locus and/or Time Response plots. Root locations are chosen for the system and for the control circuit using conventional means. Again the CAD package is used to generate the actual system and control gain matrices, which values are scaled for the computational space available, i.e., for a 16-bit processor the maximum value should not exceed 32,768 but should approach it. These gain matrices are then input to the discrete system control law and estimator equations:

$$U = [K]*[X]$$

and $$[X'] = [E]*[X]$$

where U is the drive control signal, [K] is the system gain matrix, [X] is the prior estimated parameter matrix for the system (motor, drum and connection means), [E] is the control gain matrix and [X'] is the estimated parameter matrix for the next control drive current signal. These equations may be simulated for verification using conventional simulation routines and then coded for the DSP 22.

Figure 3:
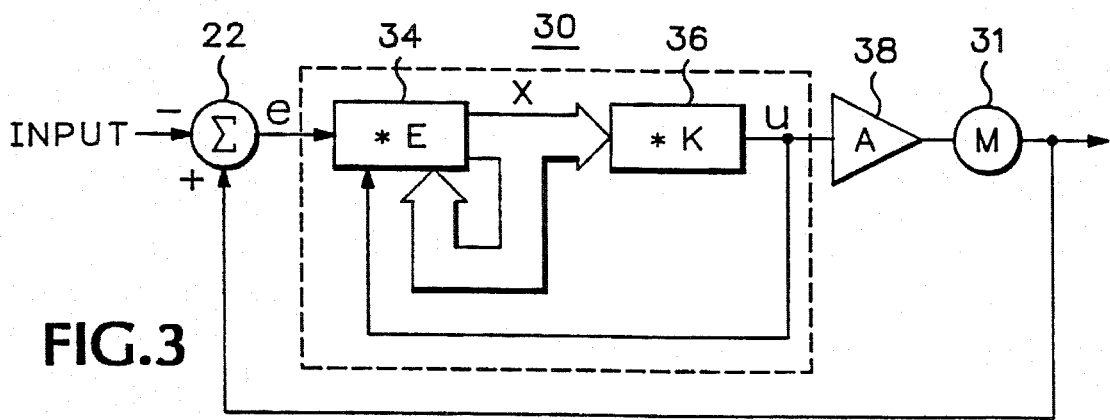
FIG. 3 is a block diagram view of a control circuit including an estimator for use in the servo system according to the present invention.

The servo algorithm used in the DSP 22 includes a class of digital control systems known as "observer" or "estimator" based. These digital control systems, as described above, include a model of the physical system to be controlled as shown in FIG. 2. The model is used to improve the quality of the degree of control. A block diagram view of a control circuit 30 as implemented in the DSP 22 is shown in FIG. 3. Assuming that the belt stiffness is such that the drum and motor position correspond to each other, i.e., K12 is infinite, then the model shown becomes a single degree of freedom problem. An input command or reference signal, indicating a desired new position r of the drum 12, for example, is input to a subtracting circuit 32 to which also is input the present position y of the drum, represented by the servo system 31, as determined from the reader device 20. The difference is an error signal e that is input to an estimator 34. The output [X] from the estimator 34 is a matrix of estimated position, speed and current for the motor 14, for example, which is input to a control law multiplier 36 for multiplication by the system gain matrix [K] to produce the control signal U. The matrix representation of the control equations for the drive motor 14 only is given by:

$$U = [K1\ K2\ K3] \begin{bmatrix} X1 \\ X2 \\ X3 \end{bmatrix}$$

and $$\begin{bmatrix} X1' \\ X2' \\ X3' \end{bmatrix} = \begin{bmatrix} E11 & E12 & E13 & E14 & E15 \\ E21 & E22 & E23 & E24 & E25 \\ E31 & E32 & E33 & E34 & E35 \end{bmatrix} \begin{bmatrix} X1 \\ X2 \\ X3 \\ U \\ e \end{bmatrix}$$

where X1 and X2 are the estimated motor position and velocity and X3 is the estimated motor current. Here a row and a column are added to the control matrix over prior art current driven control matrices, but the system uses a voltage control signal U instead of a current control signal, which reduces power amplifier complexity. The power amplifier 38 is now a simple voltage amplifier. For taking into consideration the effect of the drum 12 driven by the belt and pulley assembly 16, where the stiffness K12 is finite and there are now two degrees of freedom, another two rows and columns may be added to the system and estimator matrices to provide estimation for the drum speed and position as indicated above, i.e., $$U = [K1\ K2\ K3\ K4\ K5] * \begin{bmatrix} X1 \\ X2 \\ X3 \\ X4 \\ X5 \end{bmatrix}$$

and $$\begin{bmatrix} X1' \\ X2' \\ X3' \\ X4' \\ X5' \end{bmatrix} = \begin{bmatrix} E11 & E12 & E13 & E14 & E15 & E16 & E17 \\ E21 & E22 & E23 & E24 & E25 & E26 & E27 \\ E31 & E32 & E33 & E34 & E35 & E36 & E37 \\ E41 & E42 & E43 & E44 & E45 & E46 & E47 \\ E51 & E52 & E53 & E54 & E55 & E56 & E57 \end{bmatrix} * \begin{bmatrix} X1 \\ X2 \\ X3 \\ X4 \\ X5 \\ U \\ e \end{bmatrix}$$

where X4 and X5 respectively are the position and velocity for the controlled device, i.e., the drum 12.

Although the control circuit 30 may be implemented as a direct matrix multiply function by the DSP 22, it also may be implemented by an equivalent IIR filter for the error-based observer system shown in FIG. 3 to minimize computations. Either form of implementation may be a custom ASIC or software in a microprocessor. The coefficients for the equivalent IIR filter implementation may also be generated by the appropriate tools provided with the MATLAB program, for example. Further rather than generate the error signal e, the measured position y and reference (input) position r may be input directly to the estimator 34, adding still another column to the estimator gain matrix [E] and a row to the parameter matrix [X].

Figure 4:
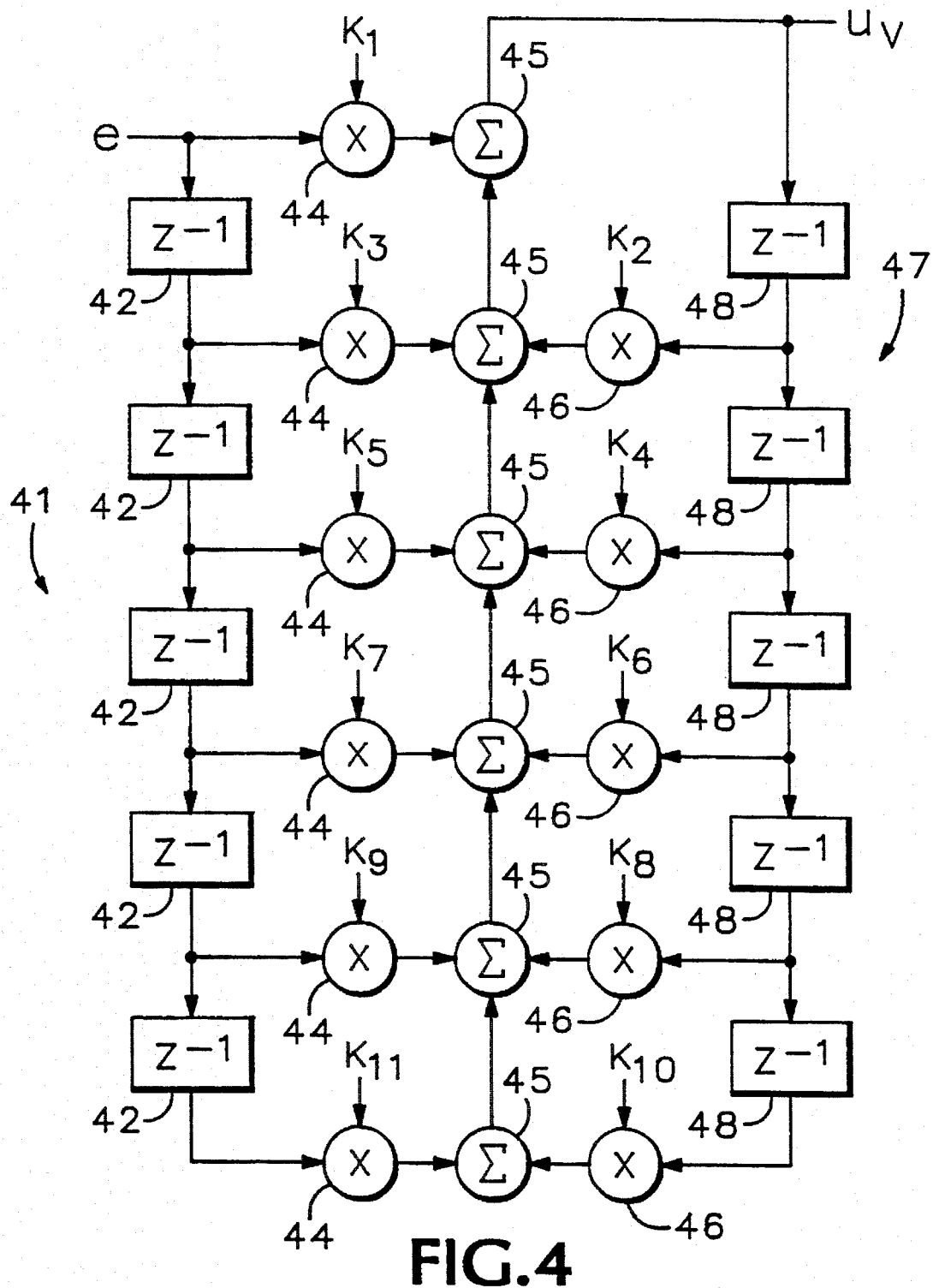
FIG. 4 is a block diagram view of a first IIR filter implementation of the estimator for use in the servo system according to the present invention.

For an IIR filter implementation a conventional five pole/five zero IIR filter configuration is shown in FIG. 4. The error signal e is input to an input tapped delay line 41 having a series chain of input delay elements 42. The input to, output from and each tap of the delay line 41 are coupled to the inputs of respective input multipliers 44 to which respective constants K1, K3, K5, K7, K9, K11 also are input. The outputs from the input multipliers 44 are input to respective summation circuits 45 that are coupled together in a series chain where the output from the last summation circuit is coupled as an input to the summation circuit immediately above it in the chain, with the output from the top summation circuit being the output signal U. The output signal also is input to an output tapped delay line 47 in the form of a series chain of delay elements 48. Each tap of the output tapped delay line and the output from the delay line are input to respective output multipliers 46 where they are multiplied by respective constants K2, K4, K6, K8, K10. The outputs from the output multipliers 46 are input to the respective lower summation circuits 45. The values of the coefficients determine a filter transfer function equivalent to the estimator 30.

Figure 5:
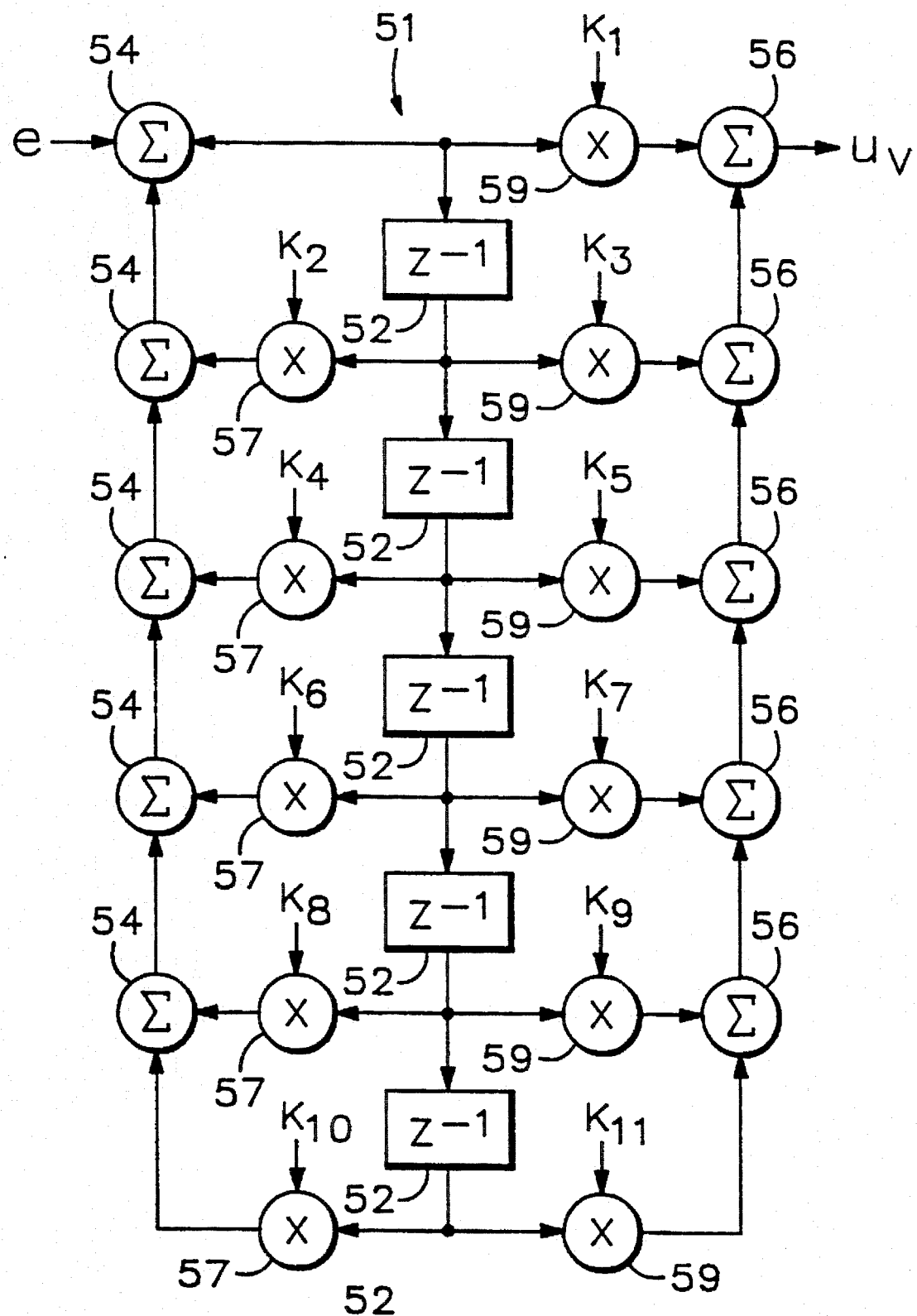
FIG. 5 is a block diagram view of a second IIR filter implementation of the estimator for use in the servo system according to the present invention.

An alternative configuration for the IIR filter estimator is shown in FIG. 5 which uses a single tapped delay line 51 in the form of a series chain of delay elements 52, an input series of summation circuits 54 and an output series of summation circuits 56. Input multipliers 57 and output multipliers 59 multiply the outputs from the delay line 51 by respective coefficients K1–K11. The outputs from the multipliers 57, 59 are input to respective summation circuits 54, 56. The error signal e is one input to the top input summation circuit 54 and the output from the top output summation circuit 56 provides the output signal U.

Figure 6:
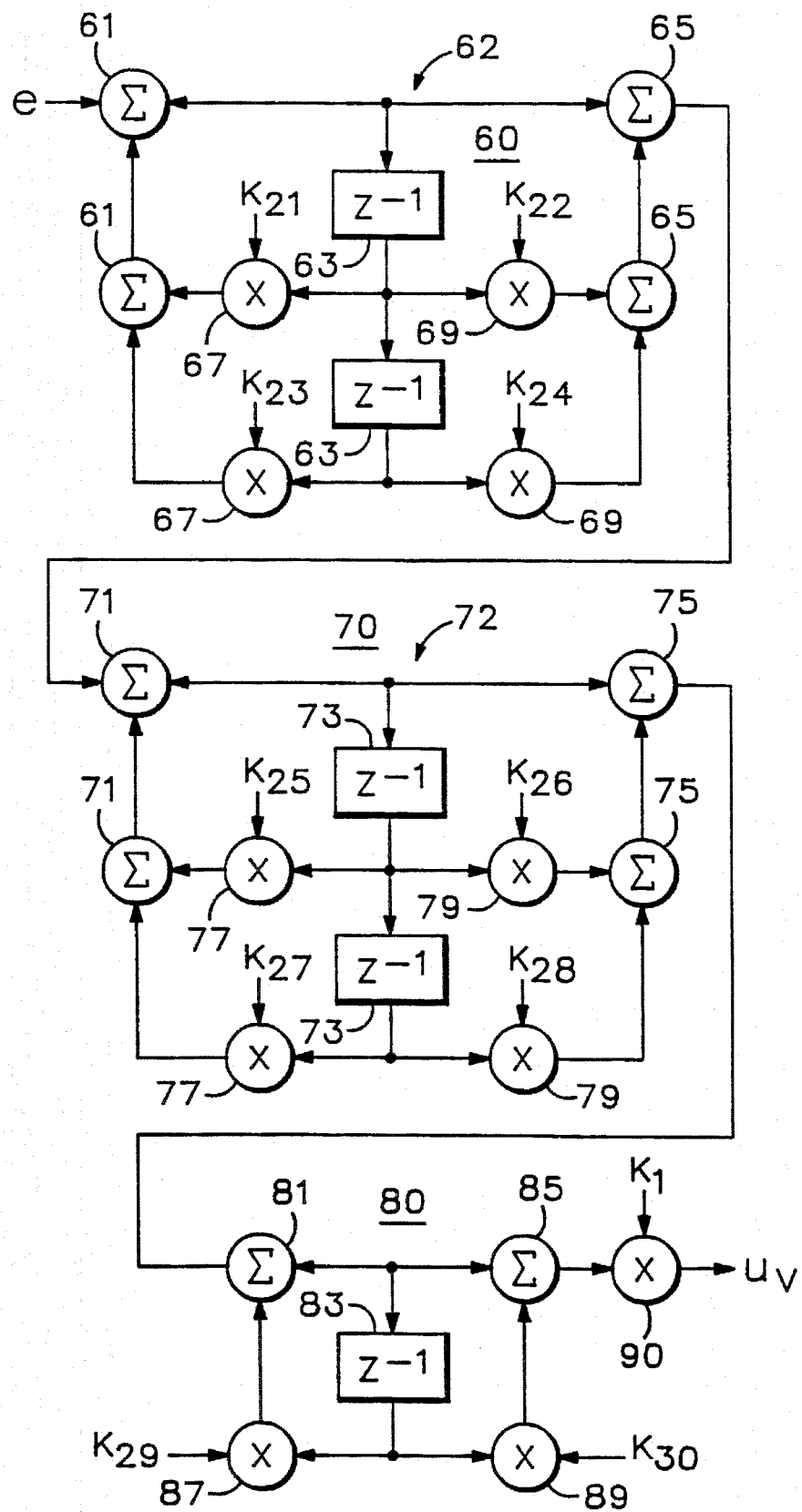
FIG. 6 is a block diagram view of a third IIR filter implementation of the estimator for use in the servo system according to the present invention.

However for improved numerical accuracy the IIR filter implementation shown in FIG. 6 is preferred. This implementation is a daisy chain of three separate IIR filters, two two-pole/two-zero stages and one single-pole/single-zero stage, which is equivalent to the implementations of FIGS. 3 and 4. The error signal e is input to a first input summation circuit 61 in a first IIR filter 60. The output from the first input summation circuit 61 is input to a short tapped delay line 62 having a pair of delay elements 63, and also to a first output summation circuit 65. The center tap and end of the delay line 62 are coupled to respective pairs of input and an output multipliers 67, 69 where they are multiplied by respective coefficients K21–K24. The outputs from the input multipliers 67 are input to a second input summation circuit 61, the output which is input to the first input summation circuit. Likewise the outputs from the output multipliers 69 are input to a second output summation circuit 65, the output of which is input to the first output summation circuit. The output from the first output summation circuit 65 is an intermediate output signal which is input to an identical IIR filter 70 using filter coefficients K25–K28 to produce a second intermediate output signal.

The second intermediate output signal is input to an input summation circuit 81 of a final IIR filter stage 80. The output from the input summation circuit 81 is coupled to a delay element 83 and the input of an output summation circuit 85. The output from the delay element 83 is input to respective input and output multipliers 87, 89 to which respective coefficients K29, K30 are applied. The outputs from the multipliers 87, 89 are input to the respective input and output summation circuits 81, 85. The output from the output summation circuit 85 is input to a final multiplier 90 where it is multiplied by a final coefficient K1 to produce the control signal U.

Although the present invention is described with reference to an error-estimator system, a standard "current" or predictor estimator may be used, and an equivalent filter circuit may be derived to emulate such a "current" estimator. Further the measured parameter may be velocity instead of position, i.e., any one of the measurable servo system parameters.

Thus the present invention provides a voltage mode drive for a servo system by estimating the current of a drive motor in addition to the position and velocity, so that the output amplifier is a relatively simple voltage driver as opposed to a complex transconductance current driver.

What is claimed is:

1. A method of voltage mode driving a servo system comprising the steps of:

measuring an instantaneous parameter for the servo system;

estimating a set of parameters for the servo system, one of the parameters being current, as a function of a prior estimated set of parameters, a voltage control signal, the instantaneous parameter, and a reference signal;

generating from the estimated set of parameters for the servo system the voltage control signal for driving the servo system;

voltage amplifying the voltage control signal before application for driving the servo system.

2. The voltage mode driving method of claim 1 wherein the estimating step comprises the steps of:

comparing the instantaneous parameter with the reference signal to generate an error signal; and determining the estimated set of parameters as a function of the error signal, the present voltage control signal and the prior estimated set of parameters.

3. The method as recited in claim 2 wherein the determining and generated steps comprise the step of IIR filtering the error signal according to a transfer function to produce the voltage control signal, the transfer function being equivalent to an error-based estimator control system.

4. A voltage mode driven servo system comprising:

means for measuring an instanteous parameter for the servo system;

means for estimating a set of parameters for the servo system, the parameters including current, as a function of the instantaneous parameters, a reference signal, a voltage control signal and a prior estimated set of parameters;

means for generating from the estimated set of parameters the voltage control signal; and a voltage amplifier coupled to the generating means for amplifying the voltage control signal before applying the voltage control signal to the servo system.

5. The voltage mode driven servo system as recited in claim 4 wherein the estimating means comprises:

means for comparing the instantaneous parameter with the reference signal to generate an error signal; and means for determining the estimated set of parameters as a function of the error signal, the voltage control signal and the prior estimated set of parameters.

6. The servo system as recited in claim 5 wherein the determining means and generating means comprises and IIR filter coupled between the comparing means and the voltage amplifier, the IIR filter having the error signal as an input and the voltage control signal as an output and having a transfer function equivalent to an error-based estimator control system for transforming the error signal into the voltage control signal.

7. The servo system as recited in claim 5 wherein the IIR filter comprises a plurality of IIR filter stages coupled in series, having the error signal as the input to the first IIR filter stage and the voltage control signal as the output from the last IIR filter stage.

8. A method of voltage mode driving a servo system comprising the steps of:

determining an error signal from a measured parameter of the servo system and a reference signal; and infinite impulse response filtering the error signal to produce a voltage control signal for driving the servo system, the coefficients upon which the infinite impulse response filtering is based being derived from an error-based estimator model for the servo system.

9. The method as recited in claim 8 wherein the infinite impulse response filtering step comprises the steps of:

estimating a set of parameters for the servo system, one of the parameters being current, from the error signal, the voltage control signal and a prior estimated set of parameters; and generating from the estimated set of parameters the voltage control signal.

\* \* \* \* \*